(12) United States Patent
Moriya

(10) Patent No.: US 8,947,461 B2
(45) Date of Patent: Feb. 3, 2015

(54) DISPLAY PROCESSING APPARATUS AND DISPLAY PROCESSING METHOD

(75) Inventor: Kinuko Moriya, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 13/311,842

(22) Filed: Dec. 6, 2011

(65) Prior Publication Data

US 2012/0139948 A1 Jun. 7, 2012

(30) Foreign Application Priority Data

Dec. 7, 2010 (JP) ................. 2010-272890

(51) Int. Cl.
*G06T 5/00* (2006.01)
*G06F 3/0484* (2013.01)
*G09G 5/373* (2006.01)
*G09G 5/377* (2006.01)

(52) U.S. Cl.
CPC ............ *G06F 3/04847* (2013.01); *G09G 5/373* (2013.01); *G09G 5/377* (2013.01); *G09G 2340/04* (2013.01)
USPC ....................................... 345/660

(58) Field of Classification Search
None
See application file for complete search history.

(56) References Cited

U.S. PATENT DOCUMENTS

| 7,499,045 | B2 * | 3/2009 | Itoh et al. ................. 345/418 |
| 2002/0067433 | A1 | 6/2002 | Yui et al. |
| 2006/0103667 | A1 * | 5/2006 | Amit et al. ................. 345/619 |
| 2006/0103891 | A1 * | 5/2006 | Atkins ................. 358/450 |
| 2009/0259935 | A1 * | 10/2009 | Kramer et al. ................. 715/234 |
| 2010/0100811 | A1 * | 4/2010 | Ishiguro ................. 715/243 |
| 2010/0149120 | A1 * | 6/2010 | Lee et al. ................. 345/173 |
| 2010/0157128 | A1 * | 6/2010 | Choi et al. ................. 348/333.03 |
| 2011/0061021 | A1 * | 3/2011 | Kang et al. ................. 715/800 |
| 2011/0134110 | A1 * | 6/2011 | Song et al. ................. 345/419 |

FOREIGN PATENT DOCUMENTS

| JP | 08-317324 A | 11/1996 |
| JP | 10-294907 A | 11/1998 |
| JP | 2002-171457 A | 6/2002 |

* cited by examiner

*Primary Examiner* — David Zarka
*Assistant Examiner* — Khoa Vu
(74) *Attorney, Agent, or Firm* — Birch, Stewart, Kolasch & Birch, LLP

(57) ABSTRACT

A display processing apparatus includes a first display processing unit for reducing a size of the display image displayed on the display unit and displaying the reduced image and a second display processing unit for displaying the graphical controller along an outer edge of the reduced display image or over a part of the reduced display image.

6 Claims, 16 Drawing Sheets

FIRST REGION

SECOND REGION

WIDTH OF GRAPHICAL CONTROLLER

WIDTH OF NON-DISPLAY REGION

DISPLAY PROCESSING APPARATUS AND DISPLAY PROCESSING METHOD

CROSS-REFERENCE TO RELATED APPLICATIONS

This nonprovisional application claims priority under 35 U.S.C. §119(a) on Patent Application No. 2010-272890 filed in Japan on Dec. 7, 2010, the entire contents of which are hereby incorporated by reference.

FIELD

The present invention relates to a display processing apparatus that displays a display image and an image for operation used in operation concerning the display image on a display screen, and to a display processing method using the display processing apparatus.

BACKGROUND

Apparatuses capable of processing images, such as a copying machine, a printer, a digital multifunction machine and the like are installed in various locations, e.g. an office, a school, a convenience store and the like. Such an apparatus, for example, displays an image such as a photograph to be output on a touch panel display screen, and executes processing such as editing, copying and printing of the image based on the operation performed by a user who saw and recognized the displayed matter.

In the case of, for example, a digital multifunction machine installed in an environment where an unspecified number of people come and go, such as a convenience store, however, a problem is caused in that secret contents can be seen by another person when an image desired by the user to be output is displayed on a display screen.

To avoid such circumstances, a method is conceived by which an image shown on a touch panel display is changed in its size by the user so that it is difficult for another person to see the image. More specifically, a method of reducing the image displayed on a touch panel display screen, moving the reduced image or the like is conceived. Such a method is disclosed in, for example, Japanese Patent Laid-Open No. 8-317324.

In a device disclosed in Patent Document 1, however, the position of a graphical controller for operation used for the reduced image shown on the display screen is not considered at all in the case where the image shown on the display screen is reduced in size for display. More specifically, the image for operation (also referred to as graphical controller) is displayed in a fixed manner at the upper right of the display screen, so that the reduced image may be separated in distance from the graphical controller, for example, causing a problem of difficult operation.

Moreover, since the graphical controller is fixed even when the reduced image is moved, the relative position of the graphical controller with respect to the displayed image before moving is different from that after moving. This also causes a problem for the user to perform operation with difficulty.

SUMMARY

The present invention has been contrived in view of the above circumstances. An object of the invention is to provide a display processing apparatus and a display processing method that can enhance operability for a displayed image.

A display processing apparatus according to the present application is an apparatus that displays a display image and a graphical controller used in an operation related to the display image on a display unit, includes a first display processing unit for reducing a size of the display image displayed on the display unit and displaying the reduced display image and a second display processing unit for displaying the graphical controller along an outer edge of the reduced display image or over a part of the reduced display image.

The display processing apparatus according to the present application includes a recording unit for recording a display position of the graphical controller displayed on the display unit and a determining unit for determining a display position of the graphical controller after a size reduction of the display image, based on the display position of the graphical controller before the size reduction of the display image, wherein the second display processing unit displays the graphical controller at the display position determined by the determining unit.

The display processing apparatus according to the present application is characterized in that the determining unit determines the display position of the graphical controller such that a relative placement of the display image and the graphical controller is maintained before and after the size reduction of the display image.

The display processing apparatus according to the present application is characterized in that the graphical controller includes a plurality of components corresponding to operational contents, and the display processing apparatus further comprising an arrangement determining unit for determining an arrangement of each of the components.

The display processing apparatus according to the present application is characterized in that the arrangement determining unit determines the arrangement of each of the components in accordance with a size of the display image after the size reduction.

The display processing apparatus according to the present application includes a comparison unit for comparing a length in a predetermined direction of a region in which the reduced display image is not displayed within a display region included in the display unit with a length in the predetermined direction of the graphical controller, wherein the second display processing unit displays on the display unit the graphical controller along the outer edge of the reduced display image when the graphical controller is shorter, and displays on the display unit the graphical controller over the part of the reduced display image when the graphical controller is longer.

The display processing apparatus according to the present application is characterized in that any one of operations is accepted through the display unit by which the graphical controller is displayed, the operations including an operation for changing a display image to be displayed, an operation for enlarging or reducing a size of the display image and an operation for changing a display position of the display image.

According to the present invention, a graphical controller can be displayed in the vicinity of or partially over a display image. This produces a beneficial effect such as improved operability while viewing the display image.

According to the present invention, for example, the display position of the graphical controller can be determined such that a relative positional relationship between the display position of display image and the display position of graphical controller is maintained. This produces a beneficial effect such as enhanced operability while grasping the positional relationship between the display image and the graphical controller.

According to the present invention, a plurality of components of the graphical controller may be changed in their arrangement, by e.g. displaying them in two or more stages. This produces a beneficial effect such as improved operability.

According to the present invention, the arrangement of the graphical controller can be determined depending on the degree of reduction for the display image. If, for example, the display image has a small reduction ratio and thus occupies a large area on the display screen, the graphical controller is shown over the display image. This eliminates a situation such that a part of the graphical controller runs off the edge of the screen and is difficult to see. The operability can thus be improved, producing a beneficial effect.

The above and further objects and features of the invention will more fully be apparent from the following detailed description with accompanying drawings.

DESCRIPTION OF PREFERRED EMBODIMENTS

A display processing apparatus and a display processing method according to the present invention will be described in detail below with reference to the drawings illustrating embodiments thereof.

Figure 1:
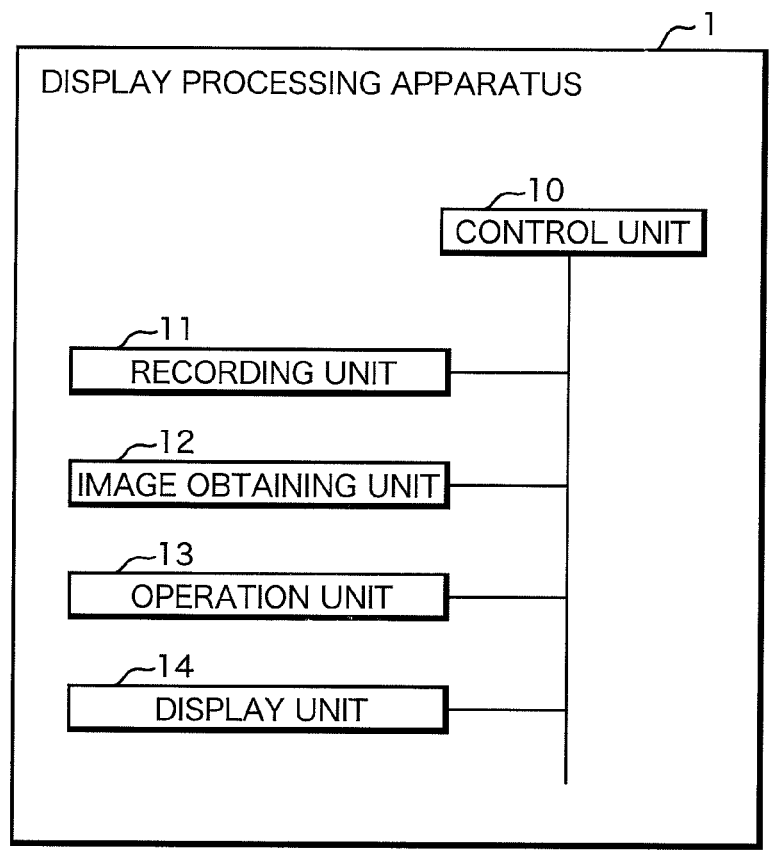
FIG. 1 is a block diagram illustrating a configuration example of hardware units in a display processing apparatus according to the present invention.

FIG. 1 is a block diagram illustrating a configuration example of hardware units in a display processing apparatus according to the present invention. The reference number 1 in FIG. 1 denotes a display processing apparatus such as a copying machine, a printer, a digital multifunction machine, a digital camera or the like. The display processing apparatus 1 includes a control unit 10, a recording unit 11, an image obtaining unit 12, an operation unit 13 and a display unit 14.

The control unit 10 is a mechanism including a CPU, various types of control circuits and the like that control the entire apparatus.

The recording unit 11 is a mechanism including various types of memories and the like that record information used in processing controlled by the control unit 10.

The image obtaining unit 12 is a mechanism that obtains image data. For example, a mechanism including a LAN port and a USB port that accepts image data from external devices, as well as an optical drive, a HDD, a flash memory slot or the like that reads image data from a recording medium serves as the image obtaining unit 12. When the image processing apparatus 1 is a copying machine or a digital multifunction machine, an image reading unit which reads an image by optical scanning functions as the image obtaining unit 12. Furthermore, when the image processing apparatus 1 is a digital camera, an image shooting unit such as CCD serves as the image obtaining unit 12.

The operation unit 13 is a mechanism such as a touch panel which accepts operation by a user, while the display unit 14 is a mechanism such as a liquid-crystal panel provided with a display screen. In the present invention, an example will be described in which a liquid-crystal touch panel is employed including the operation unit 13 and display unit 14 integrally formed thereon so that it functions as both units.

Figure 2:
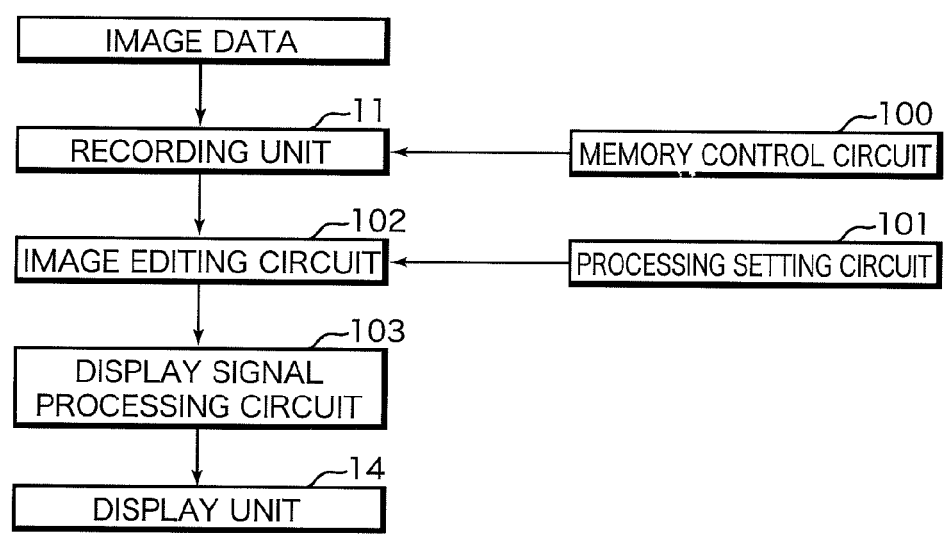
FIG. 2 is a functional block diagram illustrating a configuration example of functions of the display processing apparatus according to the present invention.

FIG. 2 is a functional block diagram illustrating a configuration example of functions of the display processing apparatus 1 according to the present invention. The recording unit 11 records image data received from the image obtaining unit 12 based on control by a memory control circuit 100 in the control unit 10.

A process setting circuit 101 in the control unit 10 receives the user's operation, which has been accepted by the operation unit 13, as positional information on the liquid-crystal touch panel, and converts the received positional information into an operation command to send it to an image editing circuit 102 in the control unit 10. The process setting circuit 101 is provided with an operation command which is set in association with positional information. That is, the process setting circuit 101 records an operation command and a display position of a graphical controller such as an operation icon (GUI component) displayed on the liquid-crystal panel of the display unit 14 in association with each other.

The image editing circuit 102 edits image data recorded in the recording unit 11 based on the operation command, and sends the data for display based on the edited image data to a display signal processing circuit 103 in the control unit 10.

The display signal processing circuit 103 sends a display signal based on the data for display to the display unit 14. The display unit 14 displays an image based on the received display signal on the liquid-crystal touch panel.

Figure 3:
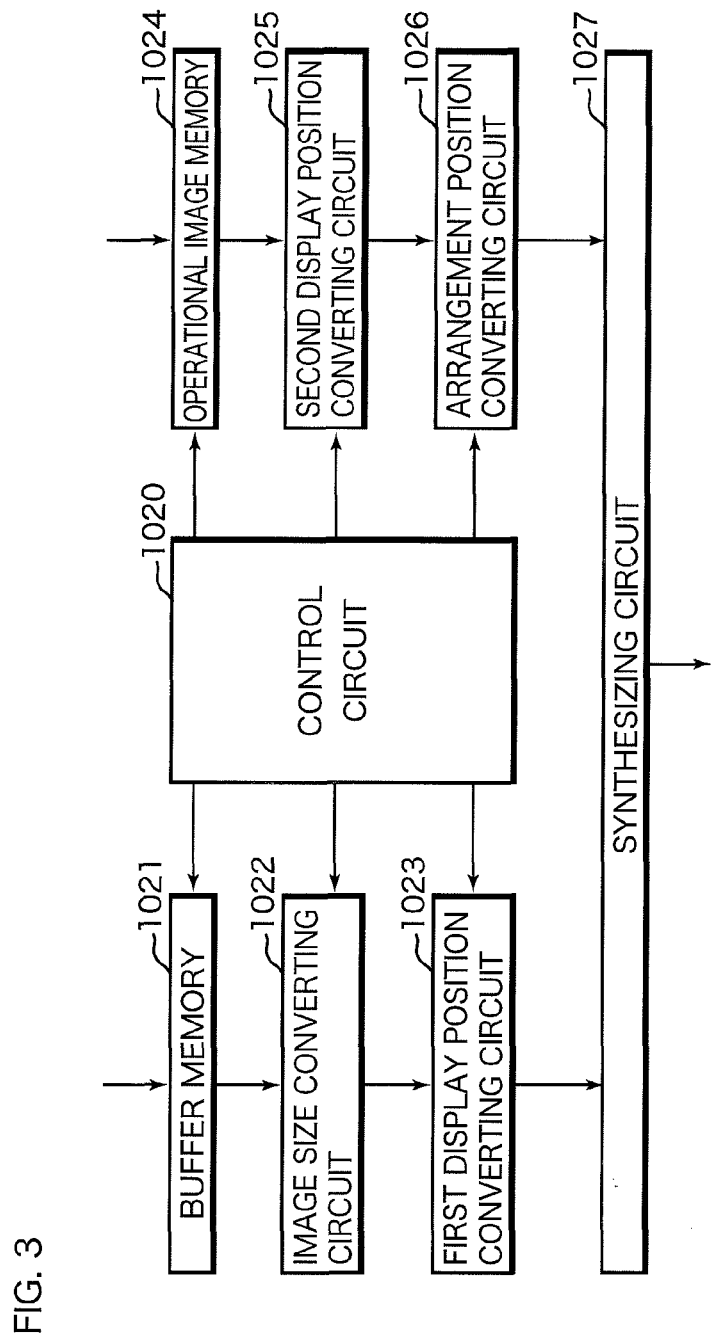
FIG. 3 is a block diagram illustrating a configuration example of an image editing circuit in the display processing apparatus according to the present invention.

FIG. 3 is a block diagram illustrating a configuration example of the image editing circuit 102 in the display processing apparatus 1 according to the present invention. The image editing circuit 102 includes a control circuit 1020, a buffer memory 1021, an image size converting circuit 1022, a first display position converting circuit 1023, an operational image memory 1024, a second display position converting circuit 1025, an arrangement position converting circuit 1026 and a synthesizing circuit 1027.

The control circuit 1020 is a circuit that controls the entire image editing circuit 102.

The buffer memory 1021 is a memory that temporarily records image data received from the recording unit 11.

The image size converting circuit 1022 is a circuit that converts the size of image data recorded in the buffer memory 1021. Note that the size of image data here indicates the size of a display image shown on the display screen of the display unit 14 based on image data, for example, the length of diagonal line when the display image has a rectangular shape.

The first position converting circuit 1023 is a circuit that converts the position of a display image shown on the display screen of the display unit 14 based on image data, i.e. a circuit that moves the display image.

The operational image memory 1024 is a memory that records image data for displaying a graphical controller which is used in operation related to a display image. The operation related to a display image here includes an operation for showing another display image and an operation for enlarging, reducing the size of, or moving a display image.

The second display position converting circuit 1025 is a circuit that converts the position of a graphical controller shown on the display screen of the display unit 14 based on graphical controller data, i.e. a circuit that moves the graphical controller.

The arrangement position converting circuit 1026 is a circuit for converting arrangement for plural components of the graphical controller shown on the display screen of the display unit 14 based on the graphical controller data.

The synthesizing circuit 1027 is a circuit that synthesizes image data with graphical controller data, generates display data for displaying an image on the display screen of the display unit 14, and sends the generated display data to the display signal processing circuit 103.

Next, display processing performed by the display processing apparatus 1 in the present invention will be described with embodiments thereof.

Embodiment 1

Figure 4A:
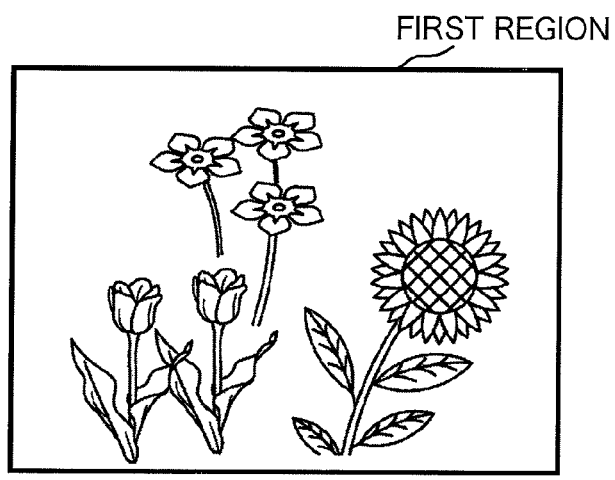
FIGS. 4A and 4B are explanatory views each illustrating an image shown on a display screen of a display unit in the display processing apparatus according to the present invention.
Figure 4B:
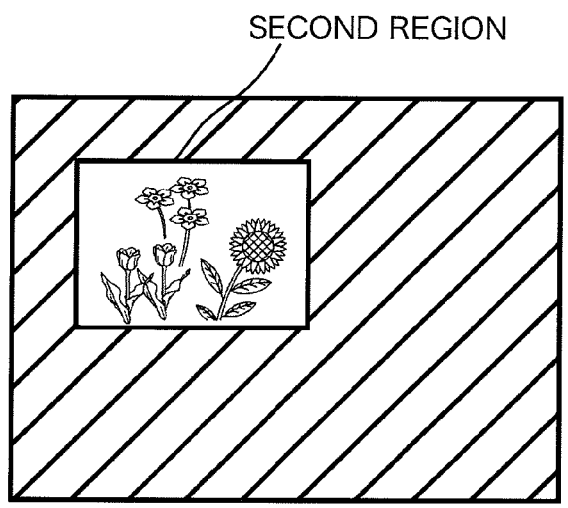

FIGS. 4A and 4B are explanatory views each illustrating an image shown on a display screen of the display unit 14 in the display processing apparatus 1 according to the present invention. FIGS. 4A and 4B illustrate basic contents of display which are the base of processing described below. FIG. 4A illustrates the state where the display image based on image data is shown on the entire display screen. The thick line in FIG. 4A indicates the outer frame of a display region on the display screen. In the description below, the area enclosed by the outer frame, i.e. the entire display region is referred to as a first region. FIG. 4B illustrates the state where the display image shown in FIG. 4A is reduced in size. In the description below, the area in which the reduced display image is shown is referred to as a second region. In FIG. 4B, the region indicated by hatched lines is an image non-display region which shows no display image in the first region. In the description below, the region within the first region but not in the second region where a display image is shown will, for convenience, be referred to as an image non-display region. In implementation, however, a background image or another different image may be displayed. Though FIGS. 4A and 4B illustrate the state where only the display image is shown in the first region, a graphical controller is also displayed together with the display image in the present invention as will be described later.

Figure 5A:
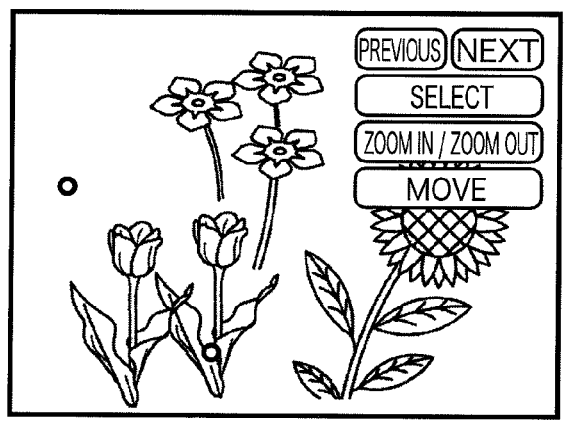
FIGS. 5A and 5B are explanatory views each illustrating an image shown on a display screen of a display unit in the display processing apparatus according to the present invention.
Figure 5B:
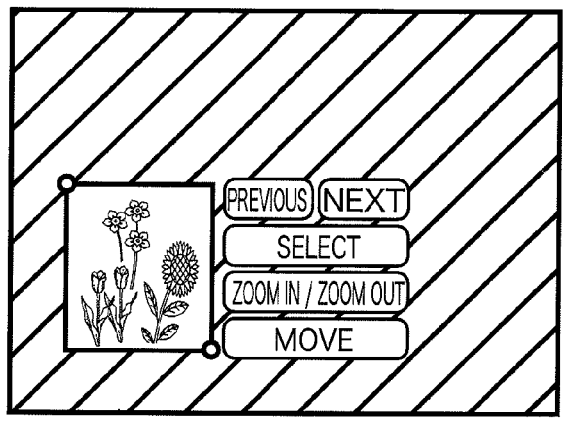

FIGS. 5A and 5B are explanatory views each illustrating an image shown on a display screen of the display unit 14 in the display processing apparatus 1 according to the present invention. FIG. 5A illustrates the state where the display image is shown on the entire display screen while the graphical controller is displayed over the display image. As shown in FIG. 5A, the graphical controller includes icon images (GUI components) indicating words such as "previous", "next", "select", "zoom in", "zoom out" and "move", and are shown at the upper right in the display screen. The icon images of "previous" and "next" are for inputting an operation to display an image different from the currently-displayed image. The icon image of "select" is for inputting an operation for selecting the displayed image as an image to be operated. The icon image of "zoom out/zoom in" is for inputting an operation for enlarging or reducing the size of the displayed image. The icon image of "move" is for inputting an operation for changing the position of the displayed image.

In the state shown in FIG. 5A, positional information indicating a position in the first region in which a graphical controller is shown as well as type information indicating a type of a graphical controller are recorded in the process setting circuit 101. From the state illustrated in FIG. 5A, the user touches the graphical controller of "previous" or "next" to switch the image to be displayed so that an image to be operated is displayed in the first region. When a desired display image to be operated is shown in the first region, the user touches the graphical controller of "select" to determine the image to be operated. Next, the user touches the graphical controller of "zoom out/zoom in" and designates two diagonal points which will form the second region. In FIG. 5A, each of the points designated by the user as diagonal points is represented by a mark "○." Coordinate positional information, indicating the positions of the designated diagonal points on a coordinate in the first region, is transmitted to the process setting circuit 101.

FIG. 5B illustrates a state in which the display image is reduced in size. The display processing apparatus 1 which received the user's operation reduces the size of the image in the first region by the image editing circuit 102, executes the processing for displaying the image in the second region and displays the image shown in FIG. 5B on the display screen of the display unit 14. Note that the graphical controller is shown at the near-right side and along the right edge of the display image shown in the second region. The graphical controller is displayed within the first region but outside the second region. The display position for the graphical controller is determined based on the positional information indicating the display position of the graphical controller before size reduction and the coordinate positional information indicating the coordinate position of the display image after size reduction. New positional information for the graphical controller after size reduction of the display image is then transmitted to the process setting circuit 101 and is managed together with the coordinate positional information for the display image.

Figure 6:
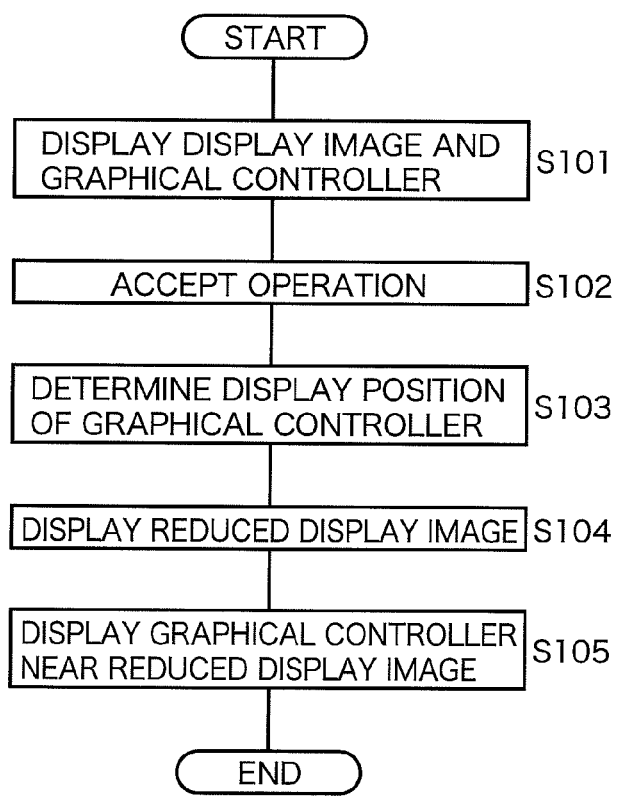
FIG. 6 is a flowchart illustrating an example of display processing performed by the display processing apparatus according to the present invention.

FIG. 6 is a flowchart illustrating an example of display processing performed by the display processing apparatus 1 according to the present invention. FIG. 6 illustrates processing performed by the display processing apparatus 1 in the case where the operation described with reference to FIGS. 5A and 5B is performed. The display processing apparatus 1 shows a display image on the entire display screen of the display unit 14, and also shows graphical controller over the display image by control of the control unit 10 (S101). At step S101, the display image and the graphical controller are shown as illustrated in FIG. 5A. In this stage, the positional information indicating the position of the graphical controller in the first region is recorded in the process setting circuit 101.

Here, the user performs operation to reduce the size of the display image. The display processing apparatus 1 accepts the operation from the operation unit 13 (S102). At step S102, the display processing apparatus 1 receives the coordinate positional information indicating the coordinate positions which are to be diagonal points for the display image after size reduction.

The display processing apparatus 1 determines the display position of the graphical controller after size reduction of the display image based on the received coordinate positional information and the positional information indicating the display position of the graphical controller before size reduction of the display image (S103). At step S103, for example, the display position is so determined as to maintain the relative positional relationship between the display image and the graphical controller, and to display the graphical controller at a position along the outer edge of the display image.

The display processing apparatus 1 shows the reduced display image on the display screen of display unit 14 (S104) and the graphical controller in the vicinity of and along the outer edge of the reduced display image (S105). At step S105, the graphical controller is shown at a position determined at step S103. By the processing performed at step S104 and S105, the image as illustrated in FIG. 5B is displayed.

By thus reducing the size of the display image, the image shown on the display screen may be made difficult for another person to see, while operability is maintained because the graphical controller is shown along the outer edge of the reduced display image.

FIGS. 7A, 7B, 8A, 8B, 9A and 9B are explanatory views illustrating images shown on the display screen of display unit 14 in the display processing apparatus 1 according to the present invention. While FIGS. 5A and 5B illustrate the graphical controller shown at the upper right side in the display screen being displayed at the right side of the display image after reduction, similar processing can be performed for other positions as illustrated in FIGS. 7A to 9B.

Figure 7A:
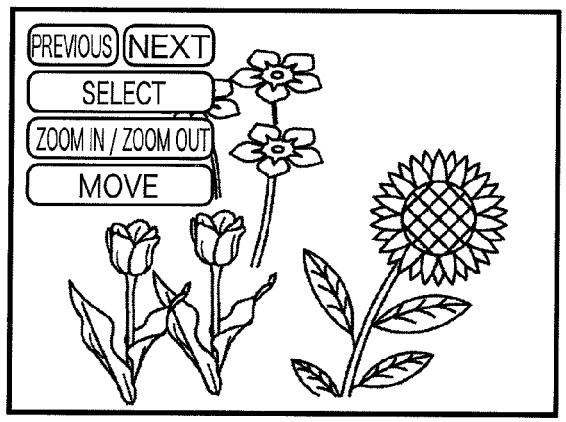
FIGS. 7A and 7B are explanatory views each illustrating an image shown on a display screen of a display unit in the display processing apparatus according to the present invention.
Figure 7B:
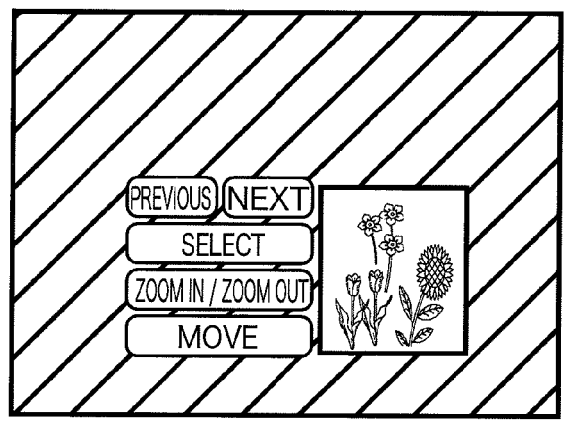

FIG. 7A illustrates the state where the display image is shown on the entire display screen while the graphical controller is shown over the display image. In the example illustrated in FIG. 7A, the graphical controller are shown at the upper-left side in the display screen. FIG. 7B illustrates the state where the display image is reduced in size from the image as illustrated in FIG. 7A. As illustrated in FIG. 7B, the graphical controller is shown at the near-left side of the display image shown in the second region and along the left edge of the display image. The graphical controller is displayed within the first region but outside the second region. Moreover, the arrangement of the plural components of the graphical controller after the size reduction of the display image is maintained the same as that before the size reduction.

Figure 8A:
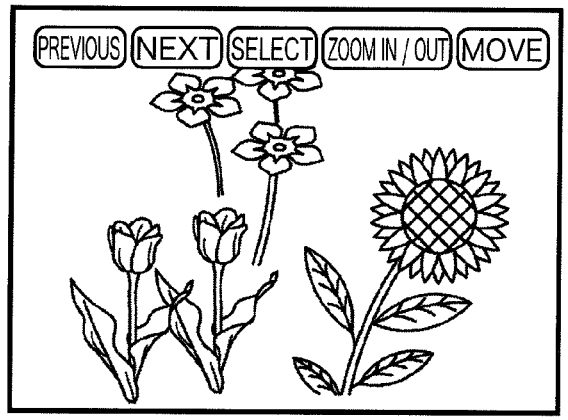
FIGS. 8A and 8B are explanatory views each illustrating an image shown on a display screen of a display unit in the display processing apparatus according to the present invention.
Figure 8B:
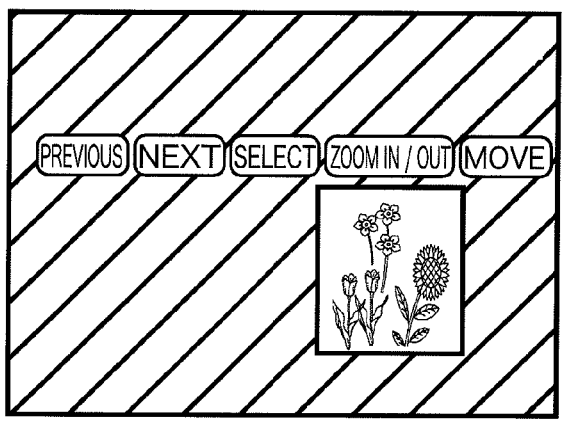

FIG. 8A illustrates a state where the display image is shown on the entire display screen while the graphical controller is shown over the display image. In the example illustrated in FIG. 8A, the to graphical controller is shown at the upper part in the display screen. FIG. 8B illustrates a state where the display image is reduced in size from the state illustrated in FIG. 8A. As illustrated in FIG. 8B, the graphical controller is shown at the upper side of the display image shown in the second region and along the upper edge of the display image. The graphical controller is shown within the first region but outside the second region. Moreover, the arrangement of the plural components of the graphical controller after the size reduction of the display image is maintained the same as that before the size reduction.

Figure 9A:
FIGS. 9A and 9B are explanatory views each illustrating an image shown on a display screen of a display unit in the display processing apparatus according to the present invention.
Figure 9B:
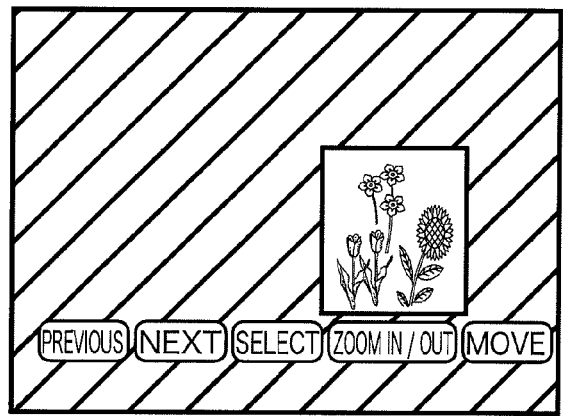

FIG. 9A illustrates the state where the display image is shown on the entire display screen while the graphical controller is shown over the display image. In the example illustrated in FIG. 9A, the graphical controller is shown at the lower part in the display screen. FIG. 9B illustrates the state where the display image is reduced in size from the state illustrated in FIG. 9A. As illustrated in FIG. 9B, the graphical controller is shown at the near-lower side of the display image shown in the second region and along the lower edge of the display image. The graphical controller is displayed within the first region but outside the second region. Moreover, the arrangement of the plural components of the graphical controller after the size reduction of the display image is maintained the same as that before the size reduction.

Embodiment 2

Figure 10A:
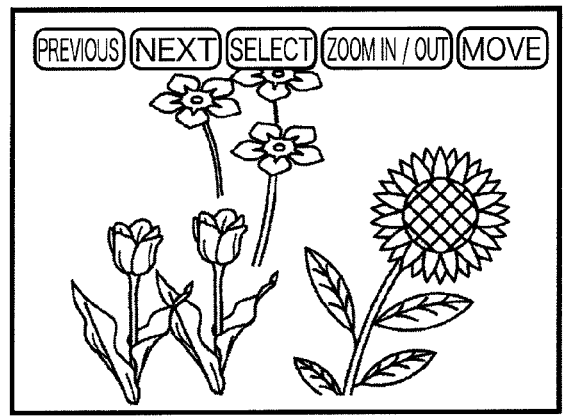
FIGS. 10A and 10B are explanatory views each illustrating an image shown on a display screen of a display unit in the display processing apparatus according to the present invention.
Figure 10B:
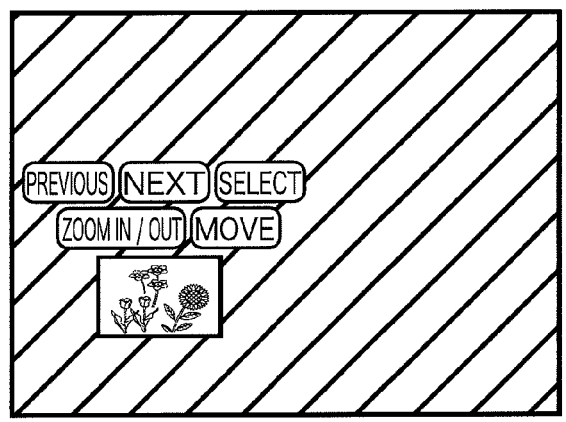

In Embodiment 2, the arrangement of the components included in the graphical controller is changed when reducing the displayed image. FIGS. 10A and 10B are explanatory views each illustrating an image shown on the display screen of the display unit 14 in the display processing apparatus 1 according to the present invention. FIG. 10A illustrates a state where the display image is shown on the entire display screen and the graphical controller is shown over the display image. In FIG. 10A, five types of components of the graphical controller are shown with an arrangement of one horizontal line. FIG. 10B illustrates a state where the display image is reduced in size from the state shown in FIG. 10A. As illustrated in FIG. 10B, plural components of the graphical controller are shown along the upper edge of the display image at the near-upper side of the display image, the arrangement thereof being changed from the one horizontal line to two lines.

Figure 11:
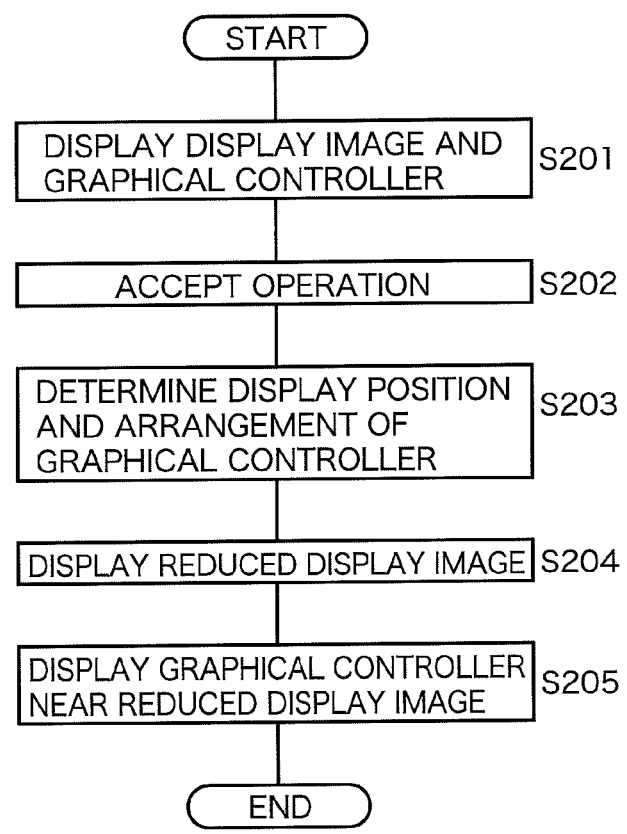
FIG. 11 is a flowchart illustrating an example of display processing performed by the display processing apparatus according to the present invention.

FIG. 11 is a flowchart illustrating an example of display processing performed by the display processing apparatus 1 according to the present invention. FIG. 11 illustrates processing performed by the display processing apparatus 1 when the operation described with reference to FIGS. 10A and 10B is performed. The display processing apparatus 1 shows, by control of the control unit 10, the display image on the entire display screen of the display unit 14 and the graphical controller over the display image (S201). At step S201, the display image and the graphical controller are shown as illustrated in FIG. 10A. In this stage, the positional information indicating the position of the graphical controller in the first region is recorded in the process setting circuit 101.

Here, the user performs an operation for reducing the size of the display image. The display processing apparatus 1 accepts the operation from the operation unit 13 (S202). At step S202, the display processing apparatus 1 receives coordinate positional information indicating coordinate positions that are to be diagonal points of the display image after size reduction.

The display processing apparatus 1 determines the display position of the graphical controller after size reduction of the display image and the arrangement of the plural components of the graphical controller, based on the received coordinate positional information and the positional information indicating the display position of the graphical controller before reduction of the display image (S203). At step S203, for example, the length in the vertical and horizontal directions of the graphical controller arranged in one line is compared with the length in the vertical and horizontal directions of the image non-display region, to determine whether or not the arrangement of one line is appropriate and to choose another arrangement such as two-line or two-column display if necessary. It is noted that the arrangement can appropriately be determined such that, for example, the components of the graphical controller are arranged in three or more columns.

The display processing apparatus 1 shows, in accordance with the accepted operation, a display image on the display screen of the display unit 14 with a reduced size (S204), and shows the graphical controller near the reduced display image and along the outer edge of the display image (S205). By the processing performed at steps S204 and S205, the image as illustrated in FIG. 10B is displayed.

Embodiment 3

Figure 12A:
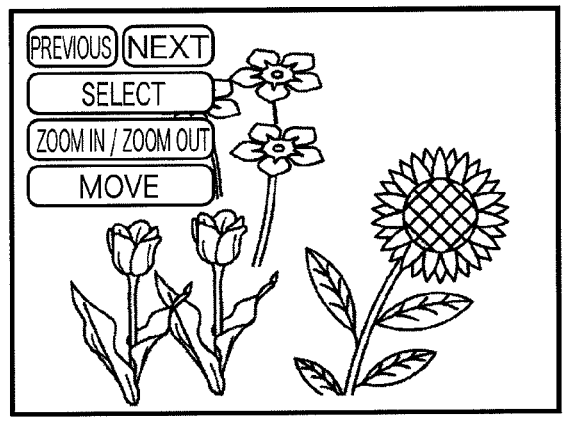
FIGS. 12A and 12B are explanatory views each illustrating an image shown on a display screen of a display unit in the display processing apparatus according to the present invention.
Figure 12B:
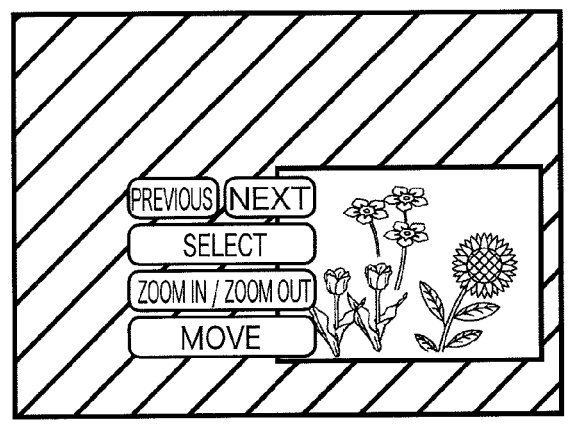

In Embodiment 3, the graphical controller is arranged over a part of the second region, instead of outside the second region. FIGS. 12A and 12B are explanatory views each illustrating an image shown on a display screen of the display unit 14 in the display processing apparatus 1 according to the present invention. FIG. 12A illustrates a state where a display image is shown on the display screen and the graphical controller is shown over the display image. FIG. 12B illustrates a state where the display image is reduced in size from the state illustrated in FIG. 12A. In the example illustrated in FIG. 12B, the graphical controller is shown on the right side of the display image with an arrangement in which a part of the graphical controller overlaps a part of the display image. That is, the graphical controller is shown at a position within the first region and crossing over a boundary line for the second region.

Figure 13A:
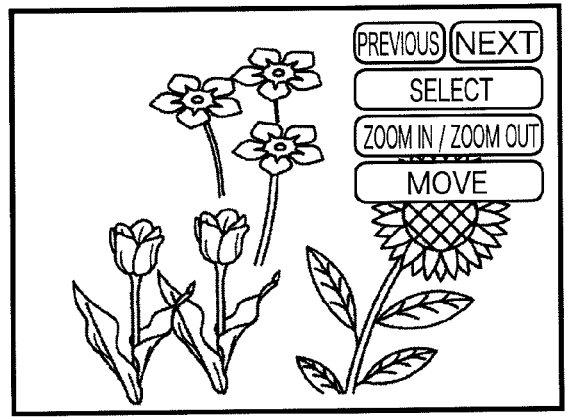
FIGS. 13A and 13B are explanatory views each illustrating an image shown on a display screen of a display unit in the display processing apparatus according to the present invention.
Figure 13B:
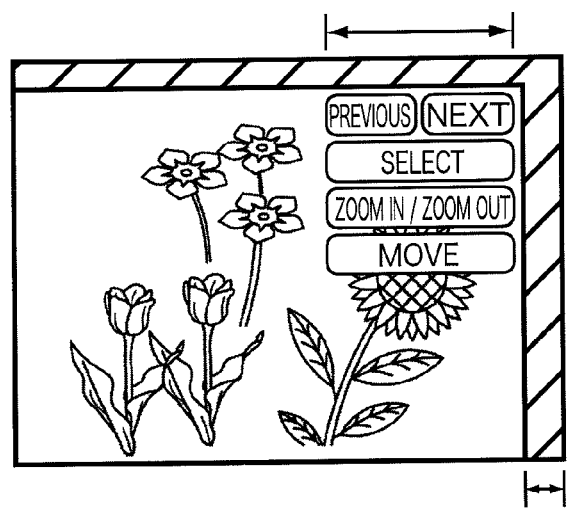

FIGS. 13A and 13B are explanatory views each illustrating an image shown on a display screen of the display unit 14 in the display processing apparatus 1 according to the present invention. FIG. 13A illustrates a state where a display image is shown on the display screen and the graphical controller is shown over the display image. FIG. 13B illustrates a state where the display image is reduced in size from the state illustrated in FIG. 13A. In the example illustrated in FIG. 13B, the graphical controller is shown on the right side of the display image with an arrangement in which all of the components of the graphical controller overlap a part of the display image. That is, the graphical controller is shown at a position within the first region and also within the second region.

How the display position of the graphical controller is determined with respect to the display image may appropriately be set. In the example illustrated in FIGS. 13A and 13B, corresponding sides of the rectangular first and second regions are arranged to be in parallel with each other. If the length between the outer frame of the first region and the outer edge of the second region, i.e. the length in the horizontal direction of the image non-display region, is shorter than the length in the horizontal direction of the graphical controller, the graphical controller is shown over the display image.

Figure 14:
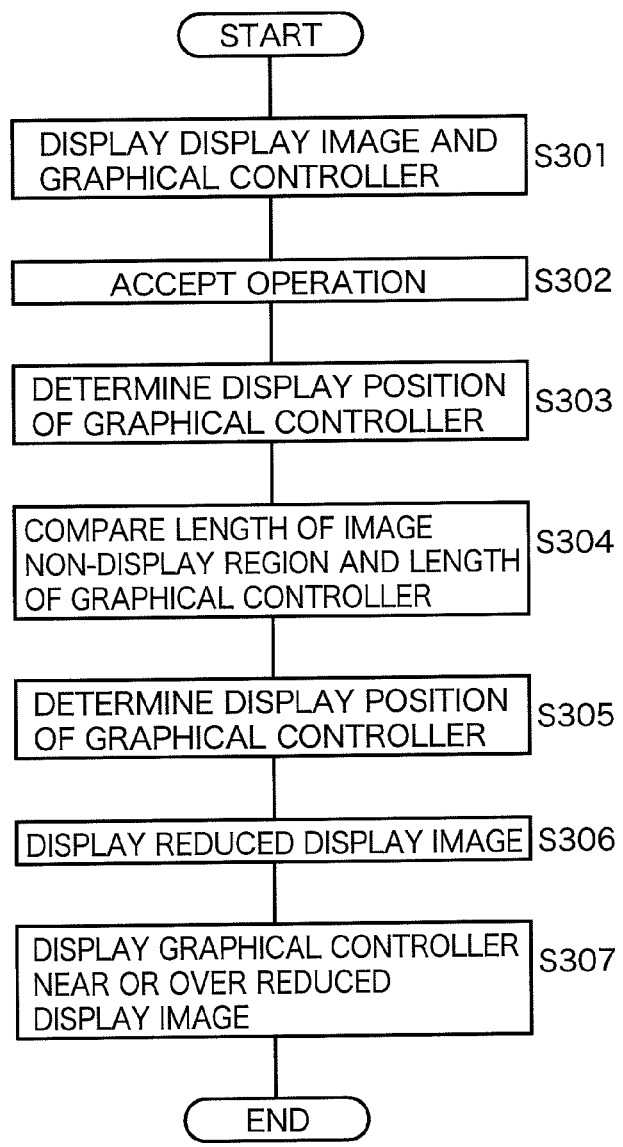
FIG. 14 is a flowchart illustrating an example of display processing performed by the display processing apparatus according to the present invention.

FIG. 14 is a flowchart illustrating an example of the display processing of the display processing apparatus 1 of the present invention. FIG. 14 illustrates the processing performed by the display processing apparatus 1 in the case where the operation described with reference to FIGS. 13A and 13B is performed. The display processing apparatus 1 shows the display image on the entire display screen of the display unit 14 and shows the graphical controller over the display image (S301). At step S301, the display image and the graphical controller are shown as illustrated in FIG. 13A. In this stage, the positional information indicating the position of the graphical controller within the first region is recorded in the process setting circuit 101.

Here, the user performs an operation for reducing the size of the display image. The display processing apparatus 1 accepts the operation from the operation unit 13 (S302). At step S302, the display processing apparatus 1 receives coordinate positional information indicating coordinate positions that are to be diagonal points for the display image after size reduction.

The display processing apparatus 1 determines a display position at which the graphical controller is to be shown after size reduction of the display image, based on the received coordinate information and the positional information indicating the display position of the graphical controller before size reduction of the display image (S303).

The image editing circuit 102 in the display processing apparatus 1 compares the length in a predetermined direction of the image non-display region near the display position at which the graphical controller is to be shown with the length in a predetermined direction of the graphical controller (S304). At step S304, the length in the predetermined direction corresponds to the length in the horizontal direction of the rectangular first region in the example illustrated in FIGS. 13A and 13B. That is, the width of the image non-display region is compared with the width of the graphical controller.

The display processing apparatus 1 determines the display position of the graphical controller based on the result of comparison at step S304 (S305). At step S305, if the length in the predetermined direction of the graphical controller is shorter, the graphical controller is shown along the outer edge of the display image. If, on the other hand, the length of the graphical controller is longer, the display position is determined such that a part or all of components of the graphical controller are shown to overlap a part of the display image.

The display processing apparatus 1 then shows the display image with a reduced size on the display screen of the display unit 14 based on the accepted operation (S306), and shows the graphical controller near the reduced display image or over a part of the display image (S307). At step S307, the graphical controller is shown with a display method based on the result determined at step S305. By the processing performed at steps S306 and S307, the image is displayed as illustrated in FIG. 13A.

Embodiment 4

Figure 15A:
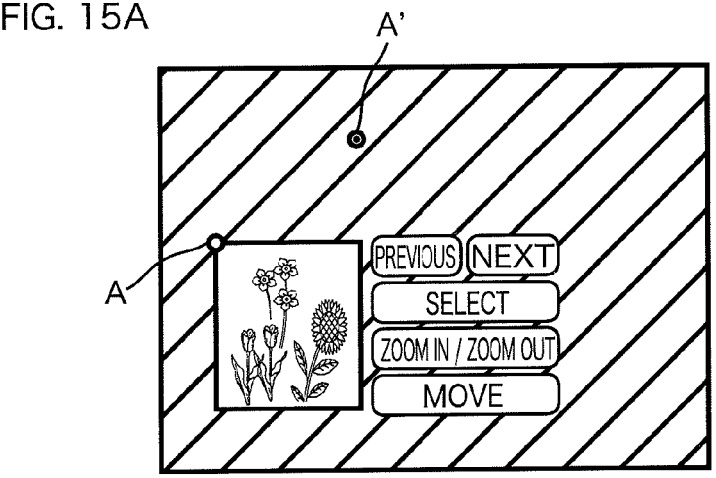
FIGS. 15A and 15B are explanatory views each illustrating an image shown on a display screen of a display unit in the display processing apparatus according to the present invention.
Figure 15B:
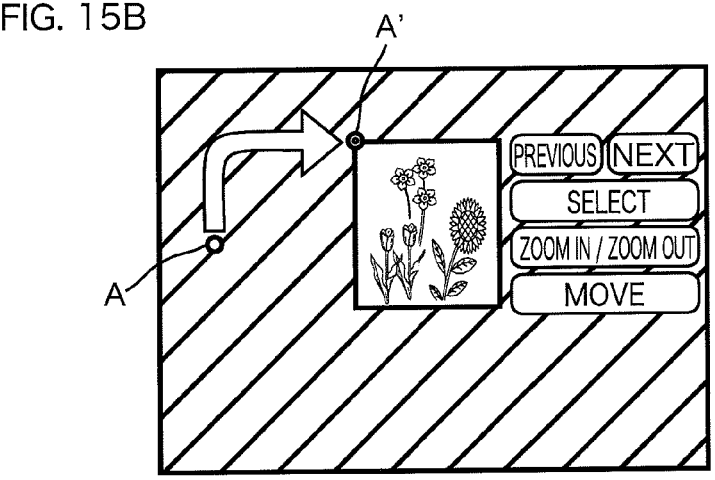

Another embodiment for the display processing apparatus 1 of the present invention will be described as an example in which a display image with a reduced size is moved. FIGS. 15A and 15B are explanatory views each illustrating an image shown on a display screen of the display unit 14 in the display processing apparatus 1 according to the present invention. FIG. 15A shows a reduced display image as the second region on a part of the display screen as well as the graphical controller at the near-right side of and along the right edge of the display image in the second region.

In the state as illustrated in FIG. 15A, the user touches a part of the display image to designate an arbitrary position on the first region to which the display image is to be moved. FIGS. 15A and 15B illustrate the state where the user touches the right top of the display image and then touches the position to which the image is to be moved (the position is hereinafter also referred to as "destination". A part of the display image touched by the user is denoted by a mark "○", while the position touched by the user as a destination is denoted by a mark "◎". The positions touched by the user are transmitted to the process setting circuit 101 as coordinate positional information for the coordinate positions of a destination and an object to be moved.

FIG. 15B shows a state where the display image has been moved. Along with the movement of the display image, the graphical controller is also moved. As a result, the graphical controller is shown at the near-right side of and along the right edge of the moved display image.

Figure 16:
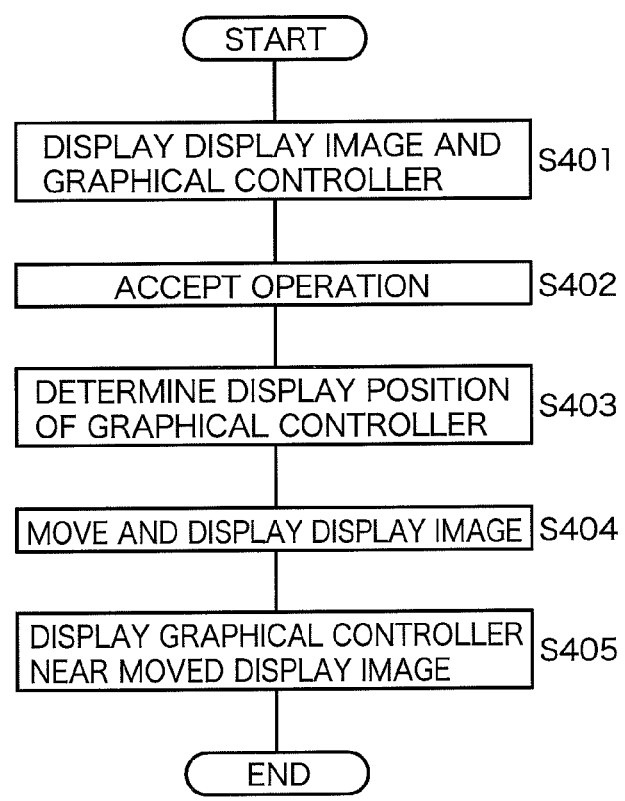
FIG. 16 is a flowchart illustrating an example of display processing performed by the display processing apparatus according to the present invention.

FIG. 16 is a flowchart illustrating an example of display processing performed by the display processing apparatus 1 according to the present invention. FIG. 16 shows the processing performed by the display processing apparatus 1 in the case where the operation as described with reference to FIGS. 15A and 15B is performed. The display processing apparatus 1 shows a reduced display image at a part of the display screen of the display unit 14 by control of the control unit 10, and also shows the graphical controller near and along the outer edge of the display image (S401). At step S401, the display image and the graphical controller are shown as illustrated in FIG. 15A.

Here, the user performs an operation for moving the display image. The display processing apparatus 1 accepts the operation from the operation unit 13 (S402). At step S402, the display processing apparatus 1 receives the display image to be moved and the coordinate positional information indicating the coordinate position of the destination.

The display processing apparatus 1 determines a display position for the graphical controller after movement of the display image based on the received coordinate positional information and the positional information indicating the display position for the graphical controller before movement of the display image (S403). At step S403, the position is determined such that, for example, a relative positional relationship between the display image and the graphical controller is maintained while the graphical controller is shown at a position along the outer edge of the display image.

The display processing apparatus 1 moves and shows the display image on the display screen of the display unit 14 based on the accepted operation (S404) and shows the graphical controller near and along the outer edge of the moved display image (S405).

At step S405, the graphical controller is shown at the position determined at step S403. By the processing performed at steps S404 and S405, the image as illustrated in FIG. 15B is shown.

The embodiments described above are mere examples of a part of countless variations of the present invention. The configuration of hardware units, procedures of processing and other terms of setting can appropriately be designed in accordance with objectives, purposes and the like. For example, the processing according to the present invention may also be applied when the reduced display image is enlarged.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A display processing apparatus which displays a display image and a graphical controller used in an operation related to the display image on a display unit, comprising:
   a processing device;
   a storage device storing instructions that, when executed by the processing device, cause the processing device to:
   reduce a size of the display image displayed on the display unit and display the reduced display image;
   display the graphical controller along an outer edge of the reduced display image or over a part of the reduced display image;
   record a display position of the graphical controller displayed on the display unit;
   automatically determine a display position of the graphical controller after a size reduction of the display image, based on a reduced display image position and the display position of the graphical controller before the size reduction of the display image, wherein the step of displaying the graphical controller displays the graphical controller at the display position determined by the determining step;
   compare a length in a predetermined direction of a region in which the reduced display image is not displayed within a display region included in the display unit with a length in the predetermined direction of the graphical controller; and
   display on the display unit the graphical controller along the outer edge of the reduced display image when the graphical controller is shorter, and display on the display unit the graphical controller over the part of the reduced display image when the graphical controller is longer.

2. The display processing apparatus according to claim 1, wherein the determining step determines the display position of the graphical controller such that a relative placement of the display image and the graphical controller is maintained before and after the size reduction of the display image.

3. The display processing apparatus according to claim 1, wherein
   the graphical controller includes a plurality of components corresponding to operational contents, and
   the storage device storing instructions, that when executed by the processing device, cause the processing device additionally to:
   determine an arrangement of each of the components.

4. The display processing apparatus according to claim 3, wherein the arrangement determining step determines the arrangement of each of the components in accordance with a size of the display image after the size reduction.

5. The display processing apparatus according to claim 1, wherein any one of operations is accepted through the display unit by which the graphical controller is displayed, the operations including an operation for changing a display image to be displayed, an operation for enlarging or reducing a size of the display image and an operation for changing a display position of the display image.

6. A display processing method of displaying a display image and a graphical controller used in an operation related to the display image on a display unit, comprising:
   reducing a size of the display image displayed on the display unit and displaying the reduced display image;
   displaying the graphical controller along an outer edge of the reduced display image or over a part of the reduced display image;
   recording a display position of the graphical controller displayed on the display unit;

automatically determining a display position of the graphical controller after a size reduction of the display image, based on a reduced display image position and the display position of the graphical controller before the size reduction of the display image, wherein the step of displaying the graphical controller displays the graphical controller at the display position determined by the determining step;

comparing a length in a predetermined direction of a region in which the reduced display image is not displayed within a display region included in the display unit with a length in the predetermined direction of the graphical controller; and displaying on the display unit the graphical controller along the outer edge of the reduced display image when the graphical controller is shorter, and displaying on the display unit the graphical controller over the part of the reduced display image when the graphical controller is longer.

* * * * *